US011219509B2

(12) United States Patent
Sabbagh

(10) Patent No.: US 11,219,509 B2
(45) Date of Patent: Jan. 11, 2022

(54) INTRAORAL TELESCOPING SPRING

(71) Applicant: Aladin Sabbagh, Nuemberg (DE)

(72) Inventor: Aladin Sabbagh, Nuemberg (DE)

( * ) Notice: Subject to any disclaimer, the term of this patent is extended or adjusted under 35 U.S.C. 154(b) by 202 days.

(21) Appl. No.: 16/379,246

(22) Filed: Apr. 9, 2019

(65) Prior Publication Data

US 2019/0307533 A1 Oct. 10, 2019

(30) Foreign Application Priority Data

Apr. 9, 2018 (DE) ...................... 10 2018 108 352.1

(51) Int. Cl.
*A61C 7/36* (2006.01)
*A61C 7/30* (2006.01)
*A61C 7/28* (2006.01)

(52) U.S. Cl.
CPC .................. *A61C 7/36* (2013.01); *A61C 7/30* (2013.01); *A61C 7/282* (2013.01)

(58) Field of Classification Search
CPC .... A61C 7/00; A61C 7/30; A61C 7/36; A61C 7/282
USPC ............................................. 433/18, 19, 21
See application file for complete search history.

(56) References Cited

U.S. PATENT DOCUMENTS

| 4,472,139 A * | 9/1984 | Rosenberg | A61C 7/36 433/19 |
| 5,120,218 A * | 6/1992 | Hanson | A61C 7/36 433/19 |
| 5,678,990 A * | 10/1997 | Rosenberg | A61C 7/36 433/19 |
| 5,711,667 A * | 1/1998 | Vogt | A61C 7/36 433/19 |
| 5,829,975 A | 11/1998 | Gold | |
| 5,964,588 A * | 10/1999 | Cleary | A61C 7/36 433/18 |
| 6,669,474 B2 | 12/2003 | Vogt | |
| 2002/0164555 A1* | 11/2002 | Vogt | A61C 7/36 433/19 |
| 2003/0022125 A1* | 1/2003 | Cleary | A63H 17/262 433/19 |

(Continued)

FOREIGN PATENT DOCUMENTS

| DE | 19624654 C2 | 1/1997 |
| DE | 69827672 T2 | 11/2005 |
| DE | 102006033774 B4 | 12/2009 |

*Primary Examiner* — Nicholas D Lucchesi
(74) *Attorney, Agent, or Firm* — Manabu Kanesaka

(57) ABSTRACT

An intraoral telescoping spring includes a first tubular element, a second tubular element and a rod-shaped element. The first tubular element includes a first connecting element wherein the first tubular element has a first end and an open second end. The second tubular element is displaceably accommodated in the first tubular element and has a spiral spring, surrounds the first tubular element and extends in the direction of the first connecting element, and attached to the fourth end thereof to force the fourth end in a direction away from the second end. The rod-shaped element is displaceably accommodated in the second tubular element and has a second connecting element for connecting to the other of the two dental arches attached to the sixth end thereof. The spiral spring is attached to the fourth end of the second tubular element, so that the first and second tubular elements are detachably connected.

16 Claims, 6 Drawing Sheets

(56) References Cited

U.S. PATENT DOCUMENTS

| | | | |
|---|---|---|---|
| 2009/0035715 A1* | 2/2009 | Cleary | A61C 7/282 |
| | | | 433/19 |
| 2009/0061377 A1* | 3/2009 | Cope | A61C 7/00 |
| | | | 433/18 |
| 2012/0135365 A1* | 5/2012 | Cleary | A61C 7/36 |
| | | | 433/10 |
| 2014/0072928 A1 | 3/2014 | Morin et al. | |
| 2015/0257858 A1* | 9/2015 | Dischinger | A61C 7/36 |
| | | | 433/19 |
| 2016/0000531 A1* | 1/2016 | Radmall | A61C 7/36 |
| | | | 433/17 |

* cited by examiner

A-A

B-B

INTRAORAL TELESCOPING SPRING

RELATED APPLICATIONS

The present application is based on, and claims priority from, German Application No. 10 2018 108 352.1 filed Apr. 9, 2018, the disclosure of which is hereby incorporated by reference herein in its entirety.

The invention relates to an intraoral telescoping spring for displacing the relative position of the maxillary and mandibular arches according to the preamble of claim 1.

BACKGROUND OF THE INVENTION

Such an intraoral telescoping spring is known from DE 698 27 672 T2.

In the known intraoral telescoping spring, a first tubular element is provided, having at the first end thereof attached a first connecting element for connecting to one of the two dental arches. A second end is open. A second tubular element having a third end is displaceably accommodated in the second end. A fourth end of the second tubular element has a spiral spring attached, which surrounds the first tubular element. The spiral spring is designed so as to force the fourth end of the second tubular element in a direction away from the second end of the first tubular element.—In the intraoral telescoping spring known from the prior art, the tubular elements can be displaced relative to one another, but are non-detachably connected to one another. They form an assembly unit.

For displacing the relative position of the maxillary and mandibular arches, it is necessary in a practical setting to use a telescoping spring that is adapted to the circumstances of the maxillary and mandibular arches. In practice, telescoping springs are offered for the right and left sides of the jaw for this purpose, in which a length of the assembly unit formed of the tubular elements and/or a characteristic curve of the spiral spring are designed differently. In practice, usually eight differently designed assembly units are kept available.

In light of the relatively large number of assembly elements to be kept available, the known telescoping springs are complex and expensive to produce. In addition, not all circumstances of maxillary and mandibular arches that occur in a practical setting can be optimally treated due to the limited number of variants of the assembly element that are kept available.

BRIEF SUMMARY OF THE INVENTION

It is the object of the invention to eliminate the disadvantages of the prior art. In particular, an intraoral telescoping spring is to be provided, which is easy to produce and can be varied in the properties thereof with greater diversity. According to a further object of the invention, a kit for producing an intraoral telescoping spring having a larger multitude of different properties is to be provided.

This object is achieved by the features of claims 1 and 11. Advantageous embodiments of the invention will be apparent from the features of claims 2 to 10 and 12 to 22.

According to the invention, it is proposed that the spiral spring is attached exclusively to the fourth end of the second tubular element, so that the first and second tubular elements are detachably connected to one another.

In a departure from the prior art, the tubular elements no longer form an assembly unit. According to the invention, it is possible, in particular, to leave a geometry of the first tubular element and of a rod-shaped element unchanged, only varying the geometry of the second tubular element and/or the spring constant or characteristic curve of the spiral spring fixedly attached thereto. As a result, according to the invention, the properties of the proposed telescoping spring can thus be varied solely by changing the second tubular element and the spiral spring attached thereto. This simplifies the production of the proposed intraoral telescoping spring. By varying only the second tubular element and/or the spiral spring attached thereto, it is possible to keep a larger number of variants available at reasonable costs. As a result, the intraoral telescoping spring makes it possible to treat a wide range of different circumstances of maxillary and mandibular arches.

According to an advantageous embodiment, the spiral spring comprises a conically tapering section in the region of the fourth end. This makes for a pleasant transition for the patient from a first large diameter in a first section of the spiral spring surrounding the first tubular element toward a smaller second diameter in a second section of the spiral spring surrounding the second tubular element.

Advantageously, the conically tapering section comprises a fastening section made of mutually abutting spring wire windings, which is connected to the second tubular element at the fourth end thereof by means of soldering or welding. The proposed embodiment makes it possible to easily and cost-effectively fasten the spiral spring to the fourth end of the second tubular element.

The fastening section can moreover form a stop for the second end of the first tubular element. As a result, it is possible to dispense with, for example, forming the stop by means of flanging in the region of the fourth end of the second tubular element. This further simplifies the production of the proposed telescoping spring.

Advantageously, the first connecting element is made of a web extending radially away from the first tubular element and including a first aperture, the web extending perpendicularly to an axial direction of the first tubular element. The proposed design of the first connecting element enables undesirable rotation of the first tubular element during attachment to one of the dental arches. In this way, in particular friction against abutting brackets can be avoided.

For fastening to the dental arch, usually a band surrounding a molar having an outer sheath fastened thereto is provided. The outer sheath comprises a small tube or headgear tube, which is used for fastening an assembly element attachable to the first connecting element. Advantageously, the assembly element for fastening to the outer sheath of the band surrounding a molar is attached to the first connecting element. The assembly element is advantageously designed in the manner of a U profile having a profile base and two profile flanks extending away therefrom. The assembly element extends across the first connecting element when assembled. Advantageously, apertures, which are used to guide a safety pin through, are provided in a mutually opposing arrangement in the two profile flanks. In the assembled state, the safety pin extends through the first aperture provided on the first connecting element.

Advantageously, a fastening rod and at least one stop rod extend away from the profile base next to one another, wherein the fastening rod is designed so as to be insertable in a tube provided in the outer sheath. The fastening rod is advantageously curved. The curvature of the fastening rod results in firm seating in the outer sheath after the fastening rod has been inserted in the tube. In addition to the fastening rod, at least one stop rod is provided. Advantageously, a stop rod is provided on each side of the fastening rod. The stop rods delimit a rotational movement about an axis formed by the fastening rod in the assembled state.

The proposed assembly element is universal. It is suitable for attachment to conventional outer sheaths. Advantageously, the assembly element has a symmetrical design. As a result, the assembly element can be connected both on the right side and on the left side of the respective dental arch to the outer sheath provided there.

The second connecting element is advantageously an annular element, the second aperture of which is designed to expand conically on both sides toward the opening surfaces thereof. The aperture designed as a double cone allows a certain degree of mobility of the second connecting element on the other dental arch when attached. This increases the wearing comfort for the patient.

According to a further embodiment, the second connecting element can comprise a stop surface pointing toward the rod-shaped element. When the rod-shaped element is fully inserted into the second tubular element, the stop surface rests against the fourth end. By applying pressure on the second connecting element, the fourth end is forced counter to the action of the spiral spring in the direction of the second end of the first tubular element.

According to the invention, a kit for producing an intraoral telescoping spring according to the invention is furthermore proposed, comprising:

a first tubular element, having a first connecting element for connecting to one of the two dental arches attached to the first end thereof, and the second end thereof being open;

a second tubular element, the third end thereof being insertable into the second end of the first tubular element so that the third end is displaceable in the first tubular element, and having attached at the fourth end thereof a spiral spring, the inside diameter of which in some sections is larger than an outside diameter of the first tubular element, so that the spiral spring surrounds the first tubular element when the second tubular element is inserted with the third end thereof into the first tubular element; and a rod-shaped element, the fifth end thereof being insertable into the second tubular element so that the fifth end can be displaced in the second tubular element, and having attached to the sixth end thereof a second connecting element for connecting to the other of the two dental arches.

The proposed kit allows the orthodontist, in a simple manner, to produce the intraoral telescoping spring so as to conform to the circumstances of the respective maxillary and mandibular arches. For this purpose, advantageously only a suitable variant of a second tubular element must be placed into the first tubular element, and furthermore the rod-shaped element must be placed into the second tubular element. The proposed telescoping spring is easy to assemble and disassemble. It can be modified quickly and easily as needed. For example, if needed, a second tubular element comprising a spiral spring having a first hardness can be replaced with another second tubular element comprising a spiral spring having a greater second hardness. The first tubular element and the rod-shaped element can be kept as is in the process.

With respect to the advantageous embodiments of the tubular elements and of the rod-shaped element reference is made to the above comments, which apply equally to the aforementioned components of the kit.

The kit advantageously comprises multiple differently configured second tubular elements, which differ in at least one of the following parameters: spring constant of the spiral spring, length of the second tubular element, length of the spiral spring. This allows different variants of the telescoping spring to be produced quickly and easily.

According to a particularly advantageous design feature, the kit comprises exactly one first tubular element and/or exactly one rod-shaped element. In such a kit, only different variants of second tubular elements are provided. This nonetheless enables a simple and fast production of different variants of the telescoping spring.

DETAILED DESCRIPTION OF THE INVENTION

Figure 1:
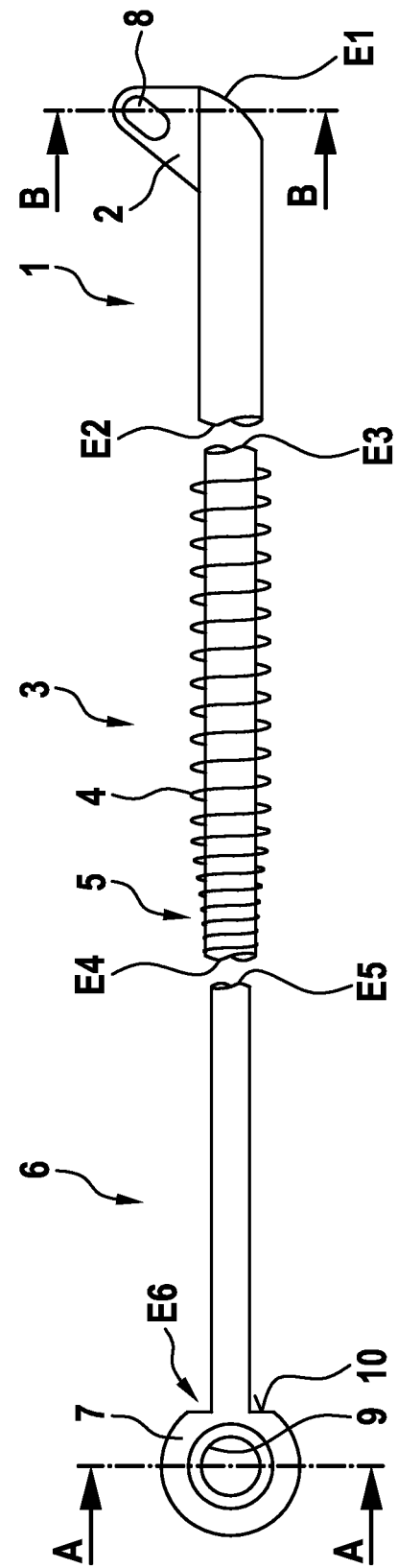
FIG. 1 shows a side view of the components of a telescoping spring when disassembled.
Figure 2:
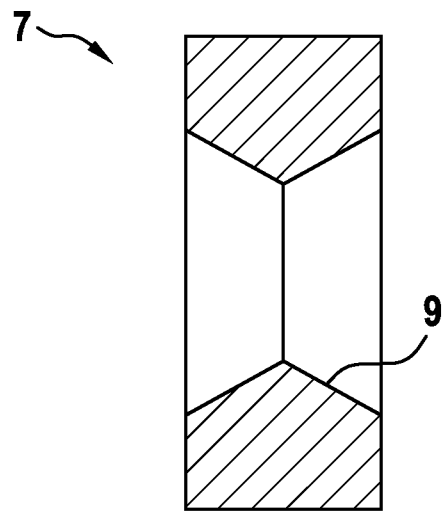
FIG. 2 shows a sectional view according to the intersecting line A-A in FIG. 1.
Figure 3:
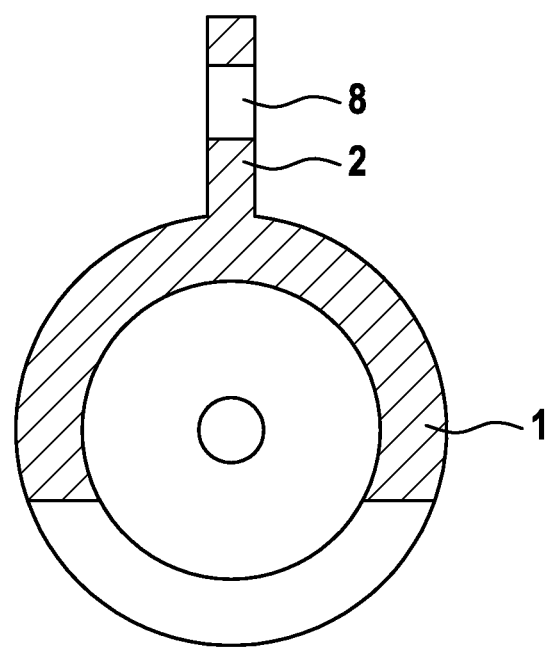
FIG. 3 shows a sectional view according to the intersecting line B-B in FIG. 1.

An exemplary embodiment of the invention will be described in more detail hereafter based on the drawings. In the figures, a first tubular element 1 comprises a first connecting element 2 for connecting to one of the two (not shown here) dental arches. A, preferably oblique, first end of the first tubular element is denoted by reference numeral E1, and an opposing open second end is denoted by reference numeral E2. A second tubular element 3 has a third end E3 and an opposing fourth end E4. A spiral spring 4 is attached to the fourth end E4. The spiral spring 4 comprises a conically tapering section 5, which forms a fastening section made of mutually abutting spring wire windings. The spiral spring 4, in particular the fastening section thereof, is fixedly connected or attached, respectively, to the second tubular element 3 at the fourth end E4 by means of soldering or welding. The conical section 5 of the spiral spring 4 advantageously forms a stop for the second end E2 of the first tubular element 1.

Reference numeral 6 denotes a rod-shaped element, which has a fifth end E5 and a sixth end E6. A second connecting element 7 for connecting to the other of the two (not shown here) dental arches is attached to the sixth end E6. The first connecting element 2 is made of a web extending radially away from the first tubular element 1 and having a first aperture 8. The first aperture 8 extends perpendicularly to an axial direction of the first tubular element 1.

The second connecting element 7 is an annular element. The second aperture 9 thereof is designed to expand conically toward the two opening surfaces thereof. The second connecting element 7 comprises stop surfaces 10, which point toward a rod section of the rod-shaped element 6 and are designed such that the fourth end E4 can strike thereagainst during the movement of the rod-shaped element 6 in the direction of the second tubular element 3.

Figure 4:
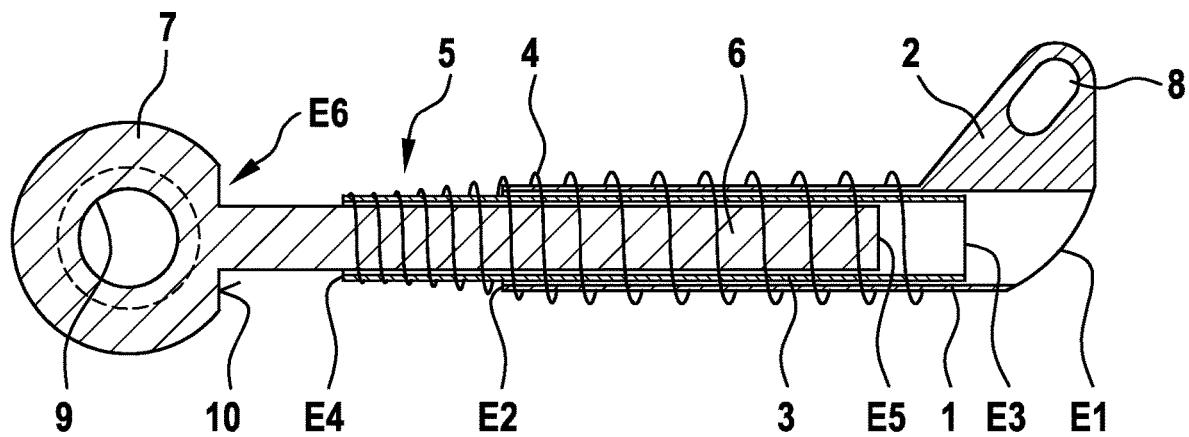
FIG. 4 shows a longitudinal sectional view through the telescoping spring when assembled.

FIG. 4 shows an axial section through a telescoping spring according to FIG. 1 when assembled. The second tubular element 3 is inserted into the first tubular element 1. The third end E3 is displaceable within the first tubular element 1. In the shown exemplary embodiment, the spiral spring 4 rests against the first connecting element 2. The spring surrounds the first tubular element 1. The spiral spring 4 forces the fourth end E4 of the second tubular element 4 in a direction away from the second end E2 of the first tubular element 1. The rod-shaped element 6 is pushed into the second tubular element 4. The fifth end E5 of the rod-shaped element 6 is displaceable in the second tubular element 3. The displaceability of the rod-shaped element 6 is limited by the stop surfaces 10 on the second connecting element 7.

Figure 5:
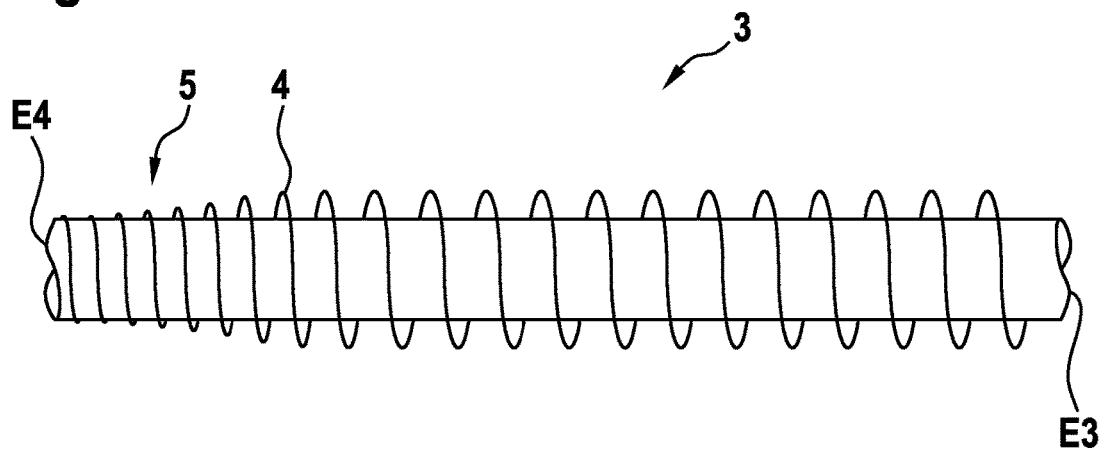
FIG. 5 shows a first variant of the second tubular element.
Figure 6:
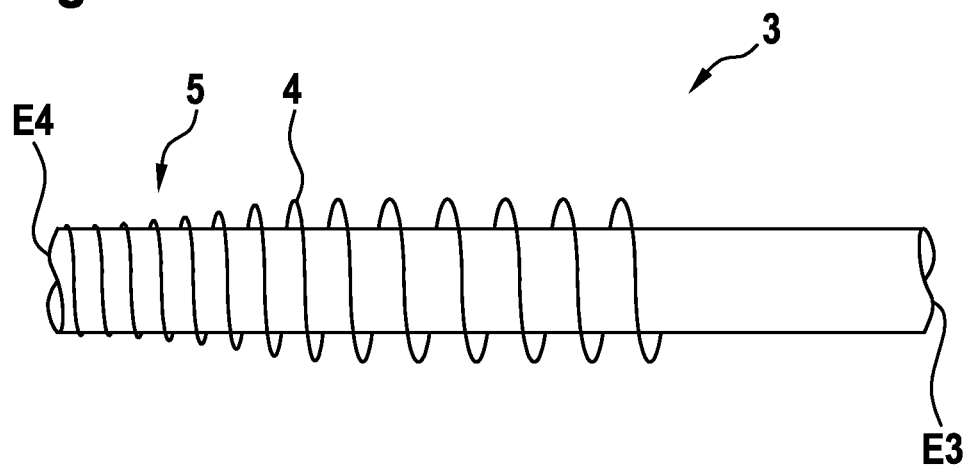
FIG. 6 shows a second variant of a second tubular element.
Figure 7:
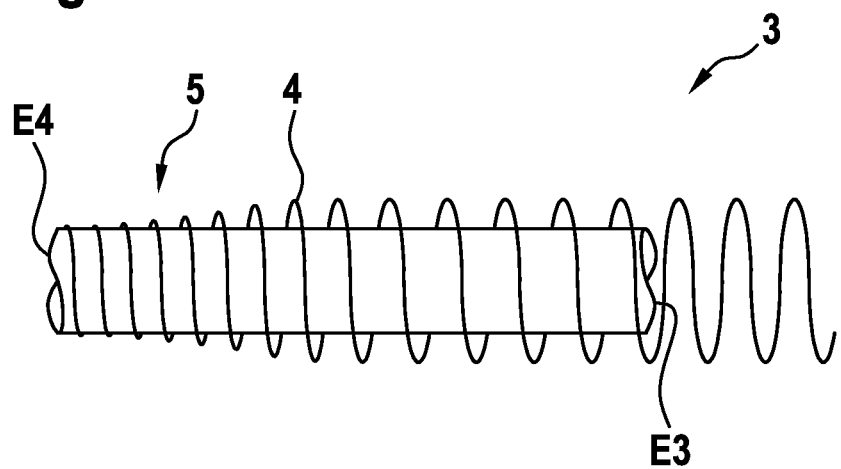
FIG. 7 shows a third variant of a second tubular element.
Figure 8:
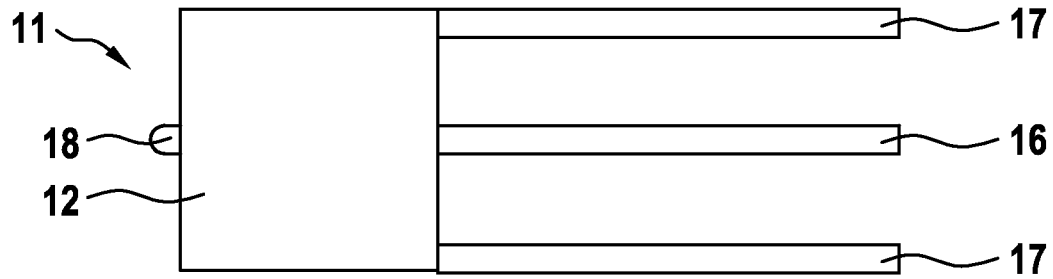
FIG. 8 shows a top view of an assembly element.
Figure 9:
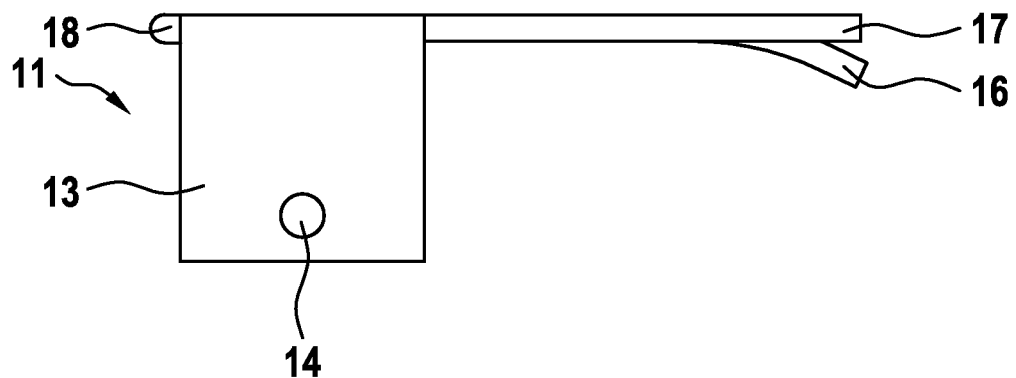
FIG. 9 shows a side view according to FIG. 8.
Figure 10:
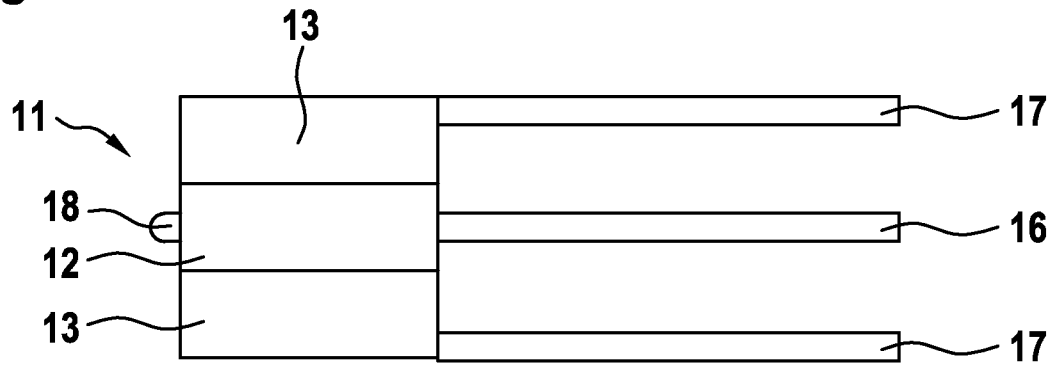
FIG. 10 shows a bottom view according to FIG. 8.
Figure 11:
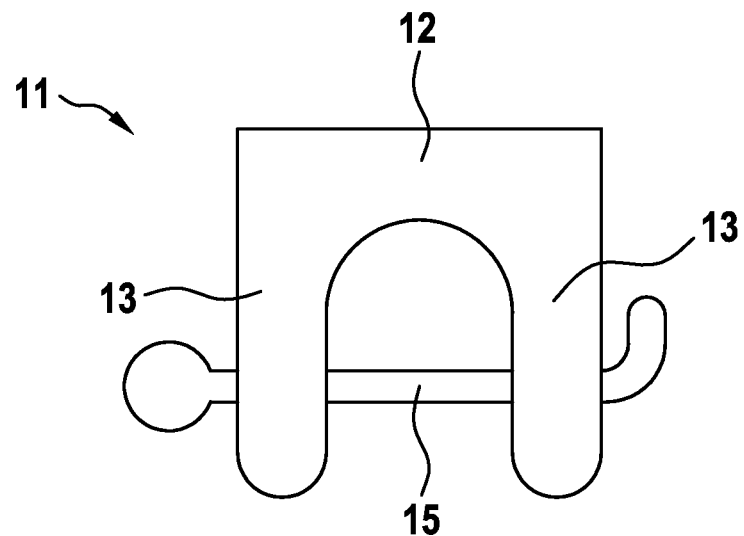
FIG. 11 shows a rear view according to FIG. 8.
Figure 12:
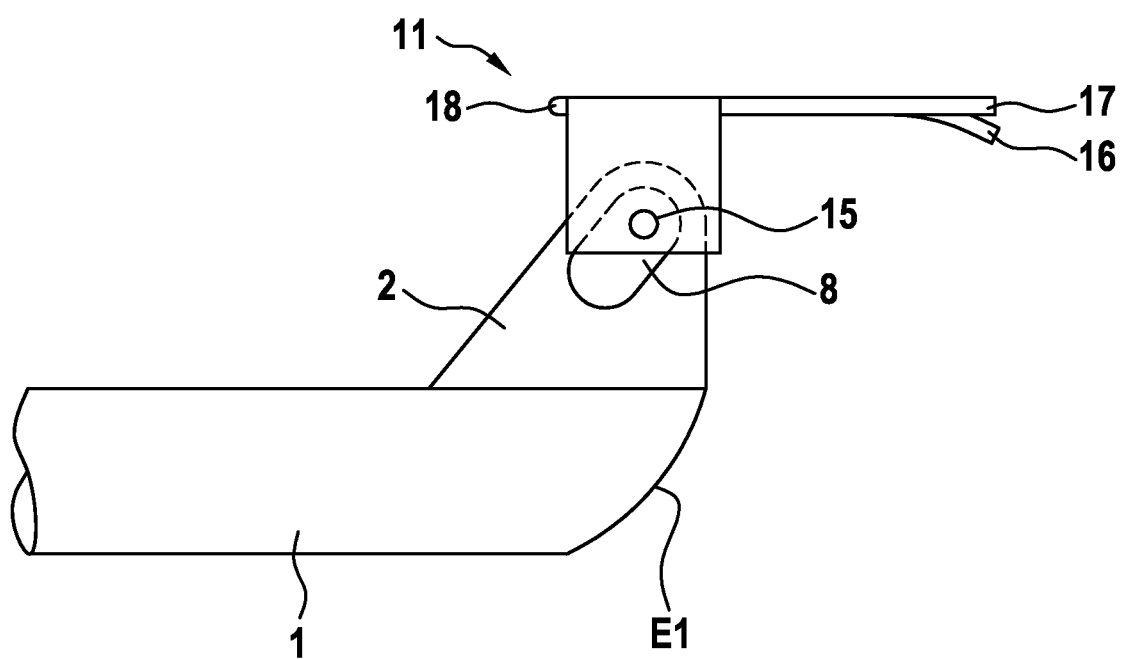
FIG. 12 shows an assembly element attached to the first connecting element.

The first tubular element 1 and the rod-shaped element 6 can be combined with differently configured second tubular elements 3. FIGS. 5 to 7 show different embodiments of second tubular elements 3 having spiral springs 4 fastened thereto. As is apparent from FIGS. 5 to 7, the second tubular element 3 can be varied in the length thereof. Moreover, a further length of the spiral spring 4 can be varied. The spiral spring 4 can approximately have the same length as the second tubular element 3. However, it may be shorter (see FIG. 6) or longer than the second tubular element 3 (see FIG. 7). Moreover, the spiral spring 4 can also be varied in terms of the characteristic curve thereof. In this way, it is possible to adapt a length of a spring travel and/or the force along the spring travel to the respective circumstances.

FIGS. 8 to 11 show an assembly element denoted, in general, by reference numeral 11. The assembly element is designed in the manner of a U profile. It comprises a profile base 12 and two profile flanks 13 extending away therefrom. The profile flanks 13 include third apertures 14 in a mutually opposing arrangement, through which a safety pin 15 extends in the assembled state. A fastening rod 16 extends from an end face of the profile base 12, and a stop rod 17 extends on each side of the fastening rod. As is apparent, in particular, from FIG. 9, the fastening rod 16 advantageously has a curvature so as to be insertable into a tube provided on an outer sheath (not shown here) in a force-fit manner. A protrusion 18, which serves to retain a rubber ring (not shown here), extends approximately centrally from another end face located opposite the end face.

The proposed assembly element 11 has the advantage to be attachable solely by insertion into the tube provided on the outer sheath.

LIST OF REFERENCE NUMERALS 1 first tubular element
2 first connecting element
3 second tubular element
4 spiral spring
5 conical section
6 rod-shaped element
7 second connecting element
8 first aperture
9 second aperture
10 stop surface
11 assembly element
12 profile base
13 profile flank
14 third aperture
15 safety pin
16 fastening rod
17 stop rod
18 protrusion
E1 first end
E2 second end
E3 third end
E4 fourth end
E5 fifth end
E6 sixth end

The invention claimed is:

1. An intraoral telescoping spring for displacing a relative position of maxillary and mandibular arches, comprising:
    a first tubular element including a first end, a second end opposite to the first end, the second end being an open end, and a first connecting element attached to the first end and adapted to connect to one of the arches;
    a second tubular element displaceably accommodated in the first tubular element through the second end, and including a third end disposed at a side of the first end inside the first tubular element, a fourth end opposite to the third end, the fourth end being an open end, and a spiral spring attached to the fourth end and extending between the fourth end and the first connecting element to surround the first tubular element, the spiral spring forcing the fourth end in a direction away from the first tubular element;
    a rod-shaped element displaceably accommodated in the second tubular element through the fourth end, and including a fifth end disposed at a side of the third end inside the second tubular element, a sixth end opposite to the fifth end, and a second connecting element attached to the sixth end and adapted to connect to the other of the arches; and
    an assembly element through which the first tubular element connects to the one of the arches, the assembly element being attached to the first connecting element and adapted to be fastened to the one of the arches,
    wherein the spiral spring includes a conically tapering section continuously tapered to the fourth end of the second tubular element and having a fastening section connected exclusively to the fourth end of the second tubular element at an end portion of the conically tapering section, so that the fastening section of the conically tapering section forms a stop for the second end of the first tubular element, and the first tubular element is capable of being detached from the second tubular element in a direction away from the fourth end of the second tubular element, and
    the assembly element includes a U profile portion connected to the first tubular element and having a profile base and two profile flanks extending away from the profile base, and a fastening rod and at least one stop rod extending perpendicular to the two profile flanks from an end face of the profile base, the at least one stop rod being disposed on a side of the fastening rod, and the fastening rod having a curvature adapted to be inserted into an outer sheath on the one of the arches.

2. The intraoral telescoping spring according to claim 1, wherein the fastening section is made of mutually abutting spring wire windings, which is connected to the second tubular element at the fourth end thereof by means of soldering or welding.

3. The intraoral telescoping spring according to claim 1, wherein the first connecting element is made of a web extending radially away from the first tubular element and having a first aperture, the web extending perpendicularly to an axial direction of the first tubular element.

4. The intraoral telescoping spring according to claim 1, wherein the second connecting element is an annular element having a second aperture designed to expand conically on both sides toward opening surfaces thereof.

5. The intraoral telescoping spring according to claim 1, wherein the second connecting element comprises a stop surface pointing toward the rod-shaped element.

6. The intraoral telescoping spring according to claim 1, wherein the assembly element further includes apertures respectively penetrating through the two profile flanks and facing to each other, a safety pin inserted into the apertures, and a protrusion protruding outwardly from a front end face of the profile base opposite to the end face and adapted to retain a rubber ring.

7. The intraoral telescoping spring according to claim 1, wherein the spiral spring has a length same as the second tubular element to be forced between the fourth end and the first connecting element.

8. A kit for producing an intraoral telescoping spring, comprising:
a first tubular element including a first end, a second end opposite to the first end, the second end being an open end, and a first connecting element attached to the first end and adapted to connect to one of the arches;
a second tubular element including a third end inserted into the second end of the first tubular element so that the third end is disposed at a side of the first end inside the first tubular element, a fourth end opposite to the third end, the fourth end being an open end, and a spiral spring attached to the fourth end and having a portion with an inside diameter larger than an outside diameter of the first tubular element, so that the spiral spring surrounds the first tubular element between the fourth end and the first connecting element when the second tubular element is inserted into the first tubular element;
a rod-shaped element including a fifth end inserted into the fourth end of the second tubular element so that the fifth end is disposed at a side of the third end inside the second tubular element, a sixth end opposite to the fifth end, and a second connecting element attached to the sixth end and adapted to connect to the other of the arches; and
an assembly element through which the first tubular element connects to the one of the arches, the assembly element being attached to the first connecting element and adapted to be fastened to the one of the arches,
wherein the spiral spring includes a conically tapering section continuously tapered to the fourth end of the second tubular element and having a fastening section connected exclusively to the fourth end of the second tubular element at an end portion of the conically tapering section, so that the fastening section of the conically tapering section forms a stop for the second end of the first tubular element, and the first tubular element is capable of being detached from the second tubular element in a direction away from the fourth end of the second tubular element, and
the assembly element includes a U profile portion connected to the first tubular element and having a profile base and two profile flanks extending away from the profile base, and a fastening rod and at least one stop rod extending perpendicular to the two profile flanks from an end face of the profile base, the at least one stop rod being disposed on a side of the fastening rod, and the fastening rod having a curvature adapted to be inserted into an outer sheath on the one of the arches.

9. The kit according to claim 8, wherein the fastening section is made of mutually abutting spring wire windings, which is connected to the second tubular element at the fourth end thereof by means of soldering or welding.

10. The kit according to claim 8, wherein the first connecting element comprises a web extending radially away from the first tubular element and having a first aperture, the web extending perpendicularly to an axial direction of the first tubular element.

11. The kit according to claim 8, wherein the second connecting element is an annular element having a second aperture designed to expand conically on both sides toward opening surfaces thereof.

12. The kit according to claim 8, wherein the second connecting element comprises a stop surface pointing toward the rod-shaped element.

13. The kit according to claim 8, further comprising a plurality of differently configured second tubular elements, which differ in at least one of a spring constant of the spiral spring, a length of the second tubular element, and a length of the spiral spring.

14. The kit according to claim 8, wherein exactly one first tubular element and/or exactly one rod-shaped element are included.

15. The kit according to claim 8, wherein the assembly element further includes apertures respectively penetrating through the two profile flanks and facing to each other, a safety pin inserted into the apertures, and a protrusion protruding outwardly from a front end face of the profile base opposite to the end face and adapted to retain a rubber ring.

16. The kit according to claim 8, wherein the spiral spring has a length same as the second tubular element to be forced between the fourth end and the first connecting element.

* * * * *